United States Patent [19]
Holmen et al.

[11] 3,836,227
[45] Sept. 17, 1974

[54] HEAT-BONDABLE RETROREFLECTIVE SHEETING

[75] Inventors: Reynold E. Holmen, White Bear Lake; Jack E. Cook, St. Paul, both of Minn.

[73] Assignee: Minnesota Mining and Manufacturing Company, St. Paul, Minn.

[22] Filed: Apr. 13, 1973

[21] Appl. No.: 350,709

[52] U.S. Cl. .................. 350/105, 404/14, 350/109, 350/293
[51] Int. Cl. ............................................. G02b 5/12
[58] Field of Search ............ 350/97, 109, 288, 293, 350/294, 299; 404/9–16

[56] References Cited
UNITED STATES PATENTS

| | | | |
|---|---|---|---|
| 3,269,839 | 8/1966 | Altman | 350/105 |
| 3,286,604 | 11/1966 | DeVries | 350/105 |
| 3,355,311 | 11/1967 | Gosselink | 350/105 |
| 3,700,305 | 10/1972 | Bingham | 350/299 |

*Primary Examiner*—Ronald L. Wibert
*Assistant Examiner*—Michael J. Tokar
*Attorney, Agent, or Firm*—Alexander, Sell, Steldt & DeLaHunt

[57] ABSTRACT

Retroreflective sheeting comprising a monolayer of spherical lens elements supported by a layer of binder material that comprises a thermoplastic heat-activatable adhesive copolymer that comprises ethylene, vinyl chloride, and acrylamide.

15 Claims, 1 Drawing Figure

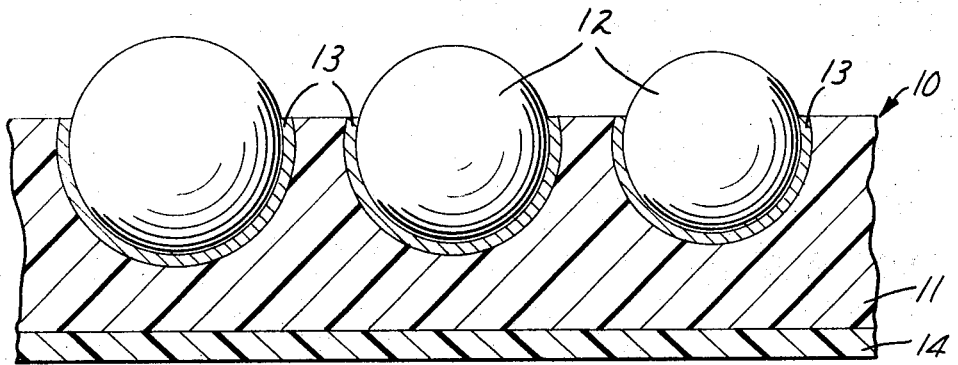

HEAT-BONDABLE RETROREFLECTIVE SHEETING

BACKGROUND OF THE INVENTION

Retroreflective sheeting that comprises a monolayer of minute spherical lens elements only partially embedded in the exterior surface of the sheeting is sometimes subjected to handling that tends to remove the spherical lens elements from the sheeting. For example, such retroreflective sheeting is sometimes laminated to a credit or identification card to provide validation or automatic sensing characteristics. The exterior surface of such a card, which on one side is formed by the partially exposed spherical lens elements, is routinely rubbed, scraped, or pressed upon, and that action tends to weaken or break the bond between the spherical lens elements and the binder material in which the spherical lens elements are supported. Also, the card is often flexed, which significantly strains the binder material and thereby again tests the bond between the spherical lens elements and binder material.

The requirements for the binder material are further increased when it is desired to adhere the retroreflective sheeting to a substrate by heating the binder material to its softening point and pressing the sheeting against the substrate. Besides adhering to the spherical lens elements and retaining that adhesion during the lamination operation, the binder layer must develop strong adhesion to the substrate against which it is pressed.

A special challenge of the latter type arises when the retroreflective sheeting is to be adhered to the gelatin surface of a photograph. The gelatin is hardened and its surface is smooth, with the result that many normally useful heat-activatable adhesives will not adhere to the gelatin layer with the desired force. A strong adhering force is especially desired where the retroreflective sheeting is to be used for validation purposes, since the validity of a document would be suspect if the validating retroreflective sheeting could be easily removed from one document and transferred to another document. The adhesion of the retroreflective sheeting to a validated document should be such that the sheeting can not be removed without destroying or mutilating the sheeting, even if the laminated sheeting and document are soaked in water or subjected to some other treatment to weaken the bond between the sheeting and document.

SUMMARY OF THE INVENTION

The present invention provides a retroreflective sheeting which includes a binder material that strongly adheres to spherical lens elements and that is also adapted to attach the sheeting to a variety of substrates, including the gelatin surface of a photograph. Briefly, retroreflective sheeting of the invention comprises a monolayer of minute spherical lens elements; specular reflective means underlying and in optical connection with the back extremities of the spherical lens elements; and a layer of binder material adhered to the specular reflective means and supporting the spherical lens elements comprising a thermoplastic heat-activatable adhesive copolymer that comprises ethylene, vinyl chloride, and acrylamide. In some embodiments the layer of binder material also preferably comprises, as an additional component, a thermoplastic heat-activatable adhesive copolymer of methyl methacrylate, ethyl acrylate, and methacrylic acid monomers. And in embodiments that are especially useful for attachment to photographs, the retroreflective sheeting preferably further includes a thermoplastic heat-activatable adhesive layer that forms the back surface of the sheeting, and this adhesive layer preferably comprises a polymer that is based on an acrylic acid and an acrylate ester.

DESCRIPTION OF THE DRAWING

The drawing shows a cross-section through an illustrative retroreflective sheeting of the invention.

DETAILED DESCRIPTION

The drawing shows an illustrative retroreflective sheeting 10 of the invention comprising a layer 11 of binder material in which spherical lens elements in the form of glass microspheres 12 each carrying specular reflective means 13 on their back extremities are partially embedded. As shown in the drawing, an adhesive layer 14 may be included in the sheeting.

The glass microspheres are generally between about 5 and 200 microns in diameter (and usually between 10 and 100 microns) for most uses of a retroreflective sheeting of the invention, and they are generally embedded to between about 30 and 80 percent of their diameter, preferably between about 50 and 70 percent of their diameter. Although the specular reflective means is shown in the drawing to be in contact with the back extremity of the glass microspheres, in some embodiments of the invention a space coat of a transparent material may separate the microspheres and the specular reflective means in order to modify the retroreflective properties of the sheeting. Also, although the microspheres are shown as partially exposed and thus forming the exterior front surface of the sheeting, in other embodiments of the invention the microspheres are covered by material that forms a flat exterior front surface of the sheeting.

In some useful embodiments of the invention, the specular reflective means is a layer of metal vapor-deposited on the microspheres. But in preferred embodiments of the invention, the specular reflective means comprises one or more layers of a transparent material having a refractive index such that the refractive index of the materials in contact with the layer, or in contact with each layer, are at least 0.1 higher or lower, and preferably at least 0.3 higher or lower, than the refractive index of the layer contacted. Each layer has an optical thickness corresponding to odd-numbered multiples of about one-quarter wavelength of light in the wavelength range of about 3,800 to about 10,000 angstroms. At least the material contacting the face or faces of the layer or layers that are closest to the spherical lens elements is transparent, and for some uses all the layers are transparent. Manufacture of retroreflective sheeting using such specular reflective layers is described more fully in Bingham, U.S. Pat. No. 3,700,305, which is incorporated herein by reference.

As previously noted, the binder material in sheeting of the invention is based upon a thermoplastic heat-activatable adhesive copolymer that comprises ethylene, vinyl chloride, and acrylamide. Generally at least 50, and preferably at least 60, percent of the binder material comprises such a copolymer. These copolymers, which are described more fully in French Specification No. 2,005,457, generally include about 70–80 percent of vinyl chloride and about 1–5 percent of acrylamide, with the balance being ethylene. Properties similar to those provided by the described copolymer should be obtained from copolymers that generally comprise a lower mono-olefin (four carbons or less); vinyl halide or vinylidene halide; and a minor amount of a mono-unsaturated polar monomer such as acrylamide, an acrylic acid, an ester of an acrylic acid, acrylonitrile, etc. The thickness of the layer of binder material is generally between about 50 and 100 percent of the diameter of the largest microspheres in the sheeting, and is usually between about 0.5 and 5 mils.

In some embodiments of the invention, particularly those employing an additional adhesive layer, an acrylate-based thermoplastic heat-activatable adhesive copolymer, such as a copolymer of methyl methacrylate, ethyl acrylate and methacrylic acid, is included in the binder material in addition to the olefin-based copolymer to provide improved adhesion to the adhesive layer. In such cases the acrylate-based copolymer comprises almost the balance of the binder material beside the olefin-based copolymer described above, though minor amounts of such additives as epoxy-type stabilizers for vinyl halide polymers, ultraviolet absorbers, pigments, dyes, plasticizers, and tackifiers may also be included.

The binder layer is useful by itself in some retroreflective sheeting of the invention to adhere the sheeting to a substrate, adhesion being developed by softening the binder layer with heat and pressing the sheeting to the substrate. The substrate may also be heated, and in fact, when the sheeting is being laminated to a photograph, the gelatin on the surface of the photograph should be heated to a temperature at which it softens without blistering (typically 120°C) to increase adhesion between the sheeting and photograph. As previously noted, adhesion to a photograph may be further improved by inclusion in the sheeting of an adhesive layer disposed over the binder layer. Such an adhesive layer preferably comprises thermoplastic heat-activatable adhesive polymers based on an acrylic acid and an acrylate ester. A particularly preferred polymer of this type is a copolymer of iso-octylacrylate and acrylic acid, preferably including about 50–80 weight-percent iso-octylacrylate. Other polymers of this kind useful as an adhesive layer include butyl acrylate-acrylic acid copolymers. The adhesive layer is generally between about 0.01 and 2 mils thick, and preferably is on the order of 0.05 mil thick.

The invention is further illustrated by the following examples (all parts and percentages are by weight unless otherwise stated).

Example 1

A monolayer of glass microspheres having diameters between about 40 and 80 microns was embedded to about 40 percent of their diameter into a polyethylene coating on a paper liner by heating the polyethylene to about 285°F. The exposed surfaces of the microspheres were then coated with a quarter-wavelength thickness of zinc sulfide by a vacuum vapor-coating method. A blend of 33.9 parts of an aqueous dispersion comprising a small amount of Butyl Cellosolve and 30 weight-percent of a copolymer that comprises 58.5 percent methyl methacrylate, 40 weight-percent ethyl acrylate, and 1.5 weight-percent methacrylic acid ("Elvacite" acrylic hydrosol 9012 made by duPont); 64.6 parts of an aqueous dispersion comprising 47 weight-percent of a copolymer that comprises 70 to 75 weight-percent vinyl chloride, 22 to 27 weight-percent ethylene, and 3 percent acrylamide ("Monflex" 4514, formerly called "Monflex" 4400, made by Monsanto); and 1.5 parts of a solution containing 61.5 parts of an epoxidized linseed oil as a stabilizer ("Paraplex" G-62 made by Rohm and Haas), 13.9 parts of diphenyl phthalate, and 24.6 parts of ethanol was coated over the exposed glass microspheres in sufficient thickness to leave a dried coating which completely covered the microspheres. The layer was dried for 10 minutes at 200°F, and about 8 to 12 grains per 24 square inches was added to the weight of the sheeting by the dry coating.

The resulting sheet material was adhered to a cardboard substrate by placing the exposed surface of the binder layer against the cardboard and then passing the combination momentarily between hot lamination rolls, which heated the interface of the binder layer and cardboard to a temperature of about 120–132°C. After the laminate had been cooled to room temperature, the polyethylene-coated carrier was stripped away.

The laminate was then tested for adhesion to the cardboard and for adhesion to the microspheres by applying under the pressure of a roller a "Scotch" Brand No. 710 pressure-sensitive adhesive tape to the microsphere-exposed surface of the laminate, and then rapidly stripping the tape from the laminate. Resistance to separation of the sheeting from the substrate or to removal of microspheres indicates satisfactory performance in normal use. In the present example failure occurred only by separation within the cardboard substrate.

Example 2

The procedure of Example 1 was repeated except that the aqueous dispersion coated on the glass microspheres comprised a blend of 60.2 parts of "Monflex" 4514, 33.5 parts of "Elvacite" acrylic hydrosol 9012, 3.3 parts of a diglycidyl ether of bisphenol A having an epoxide equivalent weight of about 180–200 ("Epon" 828 made by Shell), and 3 parts of toluene. When the sheeting had been laminated to a cardboard substrate, the binder layer was tested for adhesion to the substrate and to the microspheres in the manner described in Example 1 and again the failure occurred only by separation within the cardboard substrate.

Example 3

A binder layer was formed over a monolayer of glass microspheres in the manner described in Example 1, after which an additional layer was coated over the exposed surface of the binder layer. This second layer was applied from a coating solution comprising 8 parts of a copolymer comprising 29 parts acrylic acid and 71 parts iso-octylacrylate; 13.6 parts of ethyl acetate; 3.4 parts of methanol; 50 parts toluene, and 25 parts Butyl Cellosolve. After drying the solvent from this coating, the exposed surface of the second layer was placed against the gelatin surface of a color photographic print and the film laminated to the photograph by passing the combination through hot lamination rolls to heat the interface of the second layer and photograph to a temperature between 120 and 132°C.

When tested in the manner described in Example 1, the tape simply stripped off the glass microspheres.

Example 4

A coating solution was prepared from the following ingredients.

|  | Parts by Weight |
| --- | --- |
| "Monflex" 4514 | 300 |
| Thickener (Acrysol ASE 60 made by Rohm and Haas) | 4.5 |
| Water | 4.5 |
| Ethanol | 1.33 |
| Paraplex G-62 | 3.32 |
| Diphenyl phthalate | 0.75 |

The last three ingredients were blended together, after which the blend was added to the other ingredients and the ingredients mixed. The formulation was then coated over the partially exposed surfaces of a monolayer of glass microspheres embedded in a polyethylene-coated liner as described in Example 1. After the binder layer had dried, the sheeting was laminated to a cardboard substrate and tested in the manner described in Example 1, and failure occurred only by separation within the cardboard substrate.

What is claimed is:

1. Retroreflective sheeting comprising a monolayer of minute spherical lens elements; specular reflective means underlying and in optical connection with the back extremities of the spherical lens elements; and a layer of binder material adhered to the specular reflective means and supporting the spherical lens elements comprising a thermoplastic heat-activatable adhesive copolymer that comprises ethylene, vinyl chloride, and acrylamide.

2. Retroreflective sheeting of claim 1 in which the binder material further comprises a thermoplastic heat-activatable adhesive copolymer that comprises methyl methacrylate, ethyl acrylate, and methacrylic acid.

3. Retroreflective sheeting of claim 1 which further includes an adhesive layer that forms the back surface of the sheeting, said adhesive layer comprising a thermoplastic heat-activatable adhesive acrylate-based copolymer that comprises an acrylic acid and an acrylate ester.

4. Retroreflective sheeting of claim 3 in which the acrylate-based copolymer is a copolymer of isooctylacrylate and acrylic acid.

5. Retroreflective sheeting of claim 1 in which the specular reflective means comprises a transparent layer of refractive index $n_1$, the faces of said layer being in contact with materials of refractive index $n_2$ and $n_3$, both $n_2$ and $n_3$ being at least 0.1 either higher or lower than $n_1$, at least the material contacting that face most adjacent to the spherical lens elements being transparent, and the transparent layer having an optical thickness corresponding to an odd-numbered multiple of about one-quarter wavelength of light in the wavelength range of about 3,800 to 10,000 angstroms.

6. Retroreflective sheeting of claim 5 in which the material of refractive index $n_2$ is the material of the spherical lens elements and the material of refractive index $n_3$ is said binder material.

7. A laminated product comprising the retroreflective sheeting of claim 1 and a substrate to which the sheeting is adhered.

8. A laminated product of claim 7 in which the substrate is a photograph.

9. Retroreflective sheeting comprising a monolayer of minute spherical lens elements; specular reflective means underlying and in optical connection with the back extremities of the spherical lens elements, said specular reflective means comprising a transparent layer of refractive index $n_1$, the faces of said layer being in contact with materials of refractive index $n_2$ and $n_3$, both $n_2$ and $n_3$ being at least 0.1 either higher or lower than $n_1$, at least the material contacting that face of the layer most adjacent to the spherical lens element being transparent, and the transparent layer having an optical thickness corresponding to an odd-numbered multiple of about one-quarter wavelength of light in the wavelength range of about 3,800 to 10,000 angstroms; a layer of binder material adhered to the specular reflective means and supporting the spherical lens elements comprising at least 50 percent of a thermoplastic heat-activatable adhesive copolymer that comprises ethylene, vinyl chloride, and acrylamide; and an adhesive layer that forms the back surface of the sheeting, said adhesive layer comprising a thermoplastic heat-activatable adhesive acrylate-based copolymer that comprises an acrylic acid and an acrylate ester.

10. Retroreflective sheeting of claim 9 in which the acrylate-based copolymer is a copolymer of isooctylacrylate and acrylic acid.

11. Retroreflective sheeting of claim 9 in which the material of refractive index $n_2$ is the material of the spherical lens elements and the material of refractive index $n_3$ is said binder material.

12. A laminated product comprising the retroreflective sheeting of claim 9 and a substrate to which the sheeting is adhered.

13. A laminated product of claim 12 in which the substrate is a photograph.

14. Retroreflective sheeting of claim 9 in which the binder material further comprises a thermoplastic heat-activatable adhesive copolymer that comprises methyl methacrylate, ethyl acrylate, and methacrylic acid.

15. Retroreflective sheeting of claim 10 in which the binder material further comprises a thermoplastic heat-activatable adhesive copolymer that comprises methyl methacrylate, ethyl acrylate, and methacrylic acid.

* * * * *